(12) United States Patent
Maculan et al.

(10) Patent No.: US 10,134,094 B2
(45) Date of Patent: Nov. 20, 2018

(54) DISPLAY OF TAX REPORTS BASED ON PAYROLL DATA AND TAX PROFILE

(71) Applicant: ADP, LLC, Roseland, NJ (US)

(72) Inventors: Julien Maculan, Bloomfield, NJ (US); Rhonda M. Vollmuth, Basking Ridge, NJ (US); Richard Anderson, Mountain Lakes, NJ (US); David R. Pfrommer, Guilford, CT (US); Thomas J. Petite, Clark, NJ (US)

(73) Assignee: ADP, LLC, Roseland, NJ (US)

( * ) Notice: Subject to any disclaimer, the term of this patent is extended or adjusted under 35 U.S.C. 154(b) by 287 days.

(21) Appl. No.: 15/223,225

(22) Filed: Jul. 29, 2016

(65) Prior Publication Data
US 2018/0033093 A1 Feb. 1, 2018

(51) Int. Cl.
| | | |
|---|---|---|
| *G06F 17/00* | (2006.01) | |
| *G06Q 40/00* | (2012.01) | |
| *G06F 17/30* | (2006.01) | |
| *H04L 29/06* | (2006.01) | |
| *H04L 29/08* | (2006.01) | |
| *G06F 21/62* | (2013.01) | |

(52) U.S. Cl.
CPC ..... *G06Q 40/123* (2013.12); *G06F 17/30598* (2013.01); *G06F 17/30867* (2013.01); *G06F 21/6263* (2013.01); *H04L 63/0428* (2013.01); *H04L 67/06* (2013.01)

(58) Field of Classification Search
CPC ...... G06Q 40/103; G06Q 40/02; G06Q 40/10; G06Q 20/207; G06Q 10/10; G06Q 30/02; G06F 17/243; G06F 17/211; G06F 17/2247; G06F 17/245; G06F 17/30864; G06F 17/30867; G06F 17/30011; G06F 17/30616; G06F 17/3071; G06F 17/30038; G06K 9/00449
USPC ................ 235/375, 376; 705/19, 30, 31, 38; 707/736, 737, 738; 715/222, 223, 507
See application file for complete search history.

(56) References Cited

U.S. PATENT DOCUMENTS

| | | | |
|---|---|---|---|
| 6,912,508 B1 * | 6/2005 | McCalden | G06Q 10/10 705/16 |
| 7,669,116 B2 * | 2/2010 | Lopata | G06F 17/243 707/705 |

(Continued)

FOREIGN PATENT DOCUMENTS

EP 2290556 A1 2/2011

*Primary Examiner* — Andrew Joseph Rudy
(74) *Attorney, Agent, or Firm* — Yee & Associates, P.C.

(57) ABSTRACT

Remotely modifying a display of a client. The server transmits first instructions to the client to modify the display to present, on a first area, a plurality of different taxable entities to which the client has access, and to modify the display to present, on a second area, a plurality of different report types. The server determines, based on input from the client, a plurality of different specific forms which relate only to a first subset and are also only within a second subset. The first subset is user input from the first area of a plurality of different taxable entities to which the client has information access. The second subset is user input from the second area of the display from the plurality of different report types. The server transmits second instructions to the client to modify the second area to display only the plurality of different specific forms.

20 Claims, 8 Drawing Sheets

(56) References Cited

U.S. PATENT DOCUMENTS

| | | | | |
|---|---|---|---|---|
| 7,712,023 B1* | 5/2010 | Bryan | ................ | G06Q 40/123 |
| | | | | 705/31 |
| 7,769,646 B2* | 8/2010 | Wyle | .................. | G06F 17/243 |
| | | | | 705/19 |
| 7,853,494 B2* | 12/2010 | Wyle | .................. | G06F 17/243 |
| | | | | 705/19 |
| 7,918,396 B2* | 4/2011 | Gelbman | ............. | G06F 3/1454 |
| | | | | 235/375 |
| 8,572,083 B1* | 10/2013 | Snell | ............... | G06F 17/30115 |
| | | | | 705/38 |
| 8,656,273 B1 | 2/2014 | Tifford et al. | | |
| 9,678,936 B2* | 6/2017 | Sivertson | ............. | G06F 17/243 |
| 9,990,678 B1* | 6/2018 | Cabrera | ............. | G06Q 40/123 |
| 2003/0061131 A1 | 3/2003 | Parkan, Jr. | | |
| 2004/0167835 A1 | 8/2004 | Yaur | | |
| 2004/0205533 A1 | 10/2004 | Lopata et al. | | |

\* cited by examiner

| Maculan & Vollmuth Accounting, LLC | | |
|---|---|---|
| XYZ 110 | | Accountant Connect™ |

Clients 108
Clients  Reports  Tax Forms  Activity

Contact XYZ

Dashboard

Clients

Tax Guides

Forms

Calculators

Resources

News

Select Clients  Cancel
☐ Select All  102
☐ Amy's Pizza, LLC
☐ Bright Minds, LLC  202
☑ Cousteau, Zissou & Associates...
☐ Curry Curry Restaurant, CO
☐ Locally Grown, LLC
☐ Mike's Surf Shop, LLC
☐ Pasadena Pediatrics, LLC  204
☑ Smashing Games, CO
☑ Trueville Pediatricians, LLC
☐ UV Glasses, Inc  206

Batch 104  302
Reports  Tax Forms

Select Tax Form  ( 941R Allocation... ⊗ )

☐ All Tax Forms - Federal, State and Local  Edit
▼ Favorites 308  ☆
☐ All Quarter Forms  Edit ☆
▼ Federal
☐ 941 Employer's Quarterly Federal Tax Return  Instructions
☑ 941R Allocation Schedule for Aggregate Form 941 Filers  304  Instructions
☐ 941X Adjusted Employer's Quarterly Federal Tax Return or Claim for Refund  Instructions
☐ 8027 Employer's Annual Information Return of Tip Income and Allocated Tips  Instructions
☐ 940 Employer's Annual Federal Unemployment (FUTA) Tax Return  Instructions
☐ 943 Employer's Annual Federal Tax Return for Agricultural Employees  Instructions
▼ New Jersey
☐ NJ-927 Employer's Quarterly Report
☐ NJ-927W Employer's Quarterly Report (Weekly Depositor)
☐ WR-30 Employer's Report of Wages Paid  Instructions
▼ New York
☐ NY-MTA-305 TRANSPORTATION MOBILITY TAX RETURN  Instructions
☐ NYS-45 Quarterly Combined Withholding, Wage Reporting and UI Return/Attach...  Instructions
☐ NJ-45-ATT Attachment for Other Wages  Instructions Select Quarter
2016  Q1  (Q2)  Q3  Q4
2015  Q1  Q2  Q3  Q4  310
2014  Q1  Q2  Q3  Q4  112
     ⩔ More Years 114  ( ☆ Create Favorite )  ( ⟳ Generate Form )

☐ Privacy  ☐ Legal       ( 💬 Send Feedback )  © 2016 XYZ, LLC.

Maculan & Vollmuth Accounting, LLC

XYZ  Accountant Connect™

Dashboard
Clients
Tax Guides
Forms
Calculators
Resources
News

Clients
Clients  Reports  Tax Forms  Activity

Contact XYZ

Clients
- Amy's Pizza, LLC
- Bright Minds, LLC
- Cousteau, Zissou & Associates... Non tax filing client — 502
- Locally Grown, LLC
- Curry Curry Restaurant, CO
- Mike's Surf Shop, LLC
- Pasadena Pediatrics, LLC
- Smashing Games, CO
- Trueville Pediatricians, LLC
- UV Glasses, Inc
- Show Inactive Clients Mike's Surf Shop, LLC
The Wave Overview  Reports  Tax Forms  Activity All Tax Forms

Select Tax Form

☑ All Tax Forms - Federal, State and Local   Edit

▼ Favorites
☐ All State Forms   Edit
▶ Federal
▶ New Jersey
▶ New York

Select Quarter    504

| | | | | |
|---|---|---|---|---|
| 2016 | Q1 | Q2 | Q3 | Q4 |
| 2015 | Q1 | Q2 | Q3 | Q4 |
| 2014 | Q1 | Q2 | Q3 | Q4 |

More Years

Create Favorite   Generate Form

Privacy  Legal   Send Feedback   © 2016 XYZ, LLC.

DISPLAY OF TAX REPORTS BASED ON PAYROLL DATA AND TAX PROFILE

BACKGROUND INFORMATION

1. Field

The present disclosure relates to methods and devices for addressing the Internet-centric challenge of enabling a subscribing user to subscribe to a remote service, retrieve data from a remote server over a network, and enabling the remote server to automatically modify a client display device of the subscribing user based on the data and a tax profile provided by the remote service.

2. Background

Individuals having tax filing responsibilities, such as tax preparers, accountants, and business executives, have long wished to have a way to easily identify the necessary tax reports for multiple entities based on received data from a remote service. However, local software for organizing tax information can be expensive, and the data required may be voluminous or even unavailable in the case of multiple organizations. Therefore, methods and devices for the remote service to automatically update a local client display device with tax information from multiple entities is desirable.

SUMMARY

The illustrative embodiments provide for a method for remotely modifying a display device of a remote client computer. The method includes receiving a login request at a server computer over the Internet from the remote client computer. The method also includes: responsive to the remote client computer successfully logging in, the server computer transmitting first instructions to the remote client computer to modify a display device of the remote client computer to present, on a first area of the display device, a plurality of different taxable entities to which the remote client computer has information access, and further to modify the display device of the remote client computer to present, on a second area of the display device, a plurality of different report types. The method also includes receiving input at the server computer over the Internet from the remote client computer. The input includes a first selection on the first area of the display device of a first subset of the plurality of different taxable entities. The input further includes a second selection on the second area of the display device of a second subset of the plurality of different report types. The method also includes determining, by the server computer, a plurality of different specific forms which relate only to the first subset and are also only within the second subset. The method also includes transmitting, by the server computer over the Internet to the remote client computer, second instructions to the remote client computer to modify the second area of the display device to display only the plurality of different specific forms.

The advantageous embodiments also provide for a server computer. The server computer includes a processor, a bus connected to the processor, a communications hardware component connected to the bus, and a non-transitory computer recordable storage medium connected to the bus, storing program code which, when executed by the processor, performs an Internet-centric method for modifying a display device of a remote client computer remote from the server computer. The program code includes program code for receiving a login request at a server computer over the Internet from the remote client computer. The program code also includes program code for: responsive to the remote client computer successfully logging in, the server computer transmitting first instructions to the remote client computer to modify a display device of the remote client computer to present, on a first area of the display device, a plurality of different taxable entities to which the remote client computer has information access, and further to modify the display device of the remote client computer to present, on a second area of the display device, a plurality of different report types. The program code also includes program code for receiving input at the server computer over the Internet from the remote client computer, the input comprising a first selection on the first area of the display device of a first subset of the plurality of different taxable entities, and the input further comprising a second selection on the second area of the display device of a second subset of the plurality of different report types. The program code also includes program code for determining, by the server computer, a plurality of different specific forms which relate only to the first subset and are also only within the second subset. The program code also includes program code for transmitting, by the server computer over the Internet to the remote client computer, second instructions to the remote client computer to modify the second area of the display device to display only the plurality of different specific forms.

The advantageous embodiments also provide for a non-transitory computer recordable storage medium storing program code which, when executed by a processor, performs an Internet-centric method for modifying a display device of a remote client computer remote from a server computer. The program code includes program code for receiving a login request at a server computer over the Internet from the remote client computer. The program code also includes program code for: responsive to the remote client computer successfully logging in, the server computer transmitting first instructions to the remote client computer to modify a display device of the remote client computer to present, on a first area of the display device, a plurality of different taxable entities to which the remote client computer has information access, and further to modify the display device of the remote client computer to present, on a second area of the display device, a plurality of different report types. The program code also includes program code for receiving input at the server computer over the Internet from the remote client computer, the input comprising a first selection on the first area of the display device of a first subset of the plurality of different taxable entities, and the input further comprising a second selection on the second area of the display device of a second subset of the plurality of different report types. The program code also includes program code for determining, by the server computer, a plurality of different specific forms which relate only to the first subset and are also only within the second subset. The program code also includes program code for transmitting, by the server computer over the Internet to the remote client computer, second instructions to the remote client computer to modify the second area of the display device to display only the plurality of different specific forms.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that no known display systems are available to allow selection of multiple entities for multiple tax forms. As used herein the term "tax documents" refer to any documents used in the preparation, submission, or tracking of tax matters for taxable entities.

The advantageous embodiments also recognize and take into account that current server technologies are not capable of modifying remote displays to allow selection of multiple entities for multiple tax reports. The advantageous embodiments further recognize and take into account that it is desirable to simplify the flow of tax decision making by giving only the tax forms needed by a tax professional, especially when multiple clients in multiple tax jurisdictions are involved. The advantageous embodiments further recognize and take into account that currently, to produce tax reports across multiple clients and multiple types of forms, tax professionals must run individual reports on each individual client and then collate the reports. Additionally, a tax professional may not know all forms that might be needed or desired when multiple jurisdictions are involved.

Thus, the advantageous embodiments provide for novel ways of modifying a remote client computer to display needed or desired tax forms for multiple entities. The advantageous embodiments provide for modifying a remote client display to show taxable entities and report types which apply to a particular remote user, such as over an Internet connection. Based on received selections, the advantageous embodiments provide for payroll data and tax profiles which are used to run reports on the server side. The remote client display is then modified by the server to show the returned reports. Therefore, the advantageous embodiments may be characterized as methods and devices for display of tax reports based on payroll data and tax profile.

In an example, multiple entities are listed on one part of the screen of the remote client, while available tax forms display on another part of the screen. As a backend engine on the server side determines what tax forms can be selected when multiple entities are selected, the availability of forms can be communicated to a user through checkboxes or the non-availability communicated as gray-outs. Once the selection is done, tax forms can be automatically generated for each entity. In some cases, not just the reports are displayed, but electronic copies of the reports themselves could be transmitted to the remote client computer.

Figure 1:
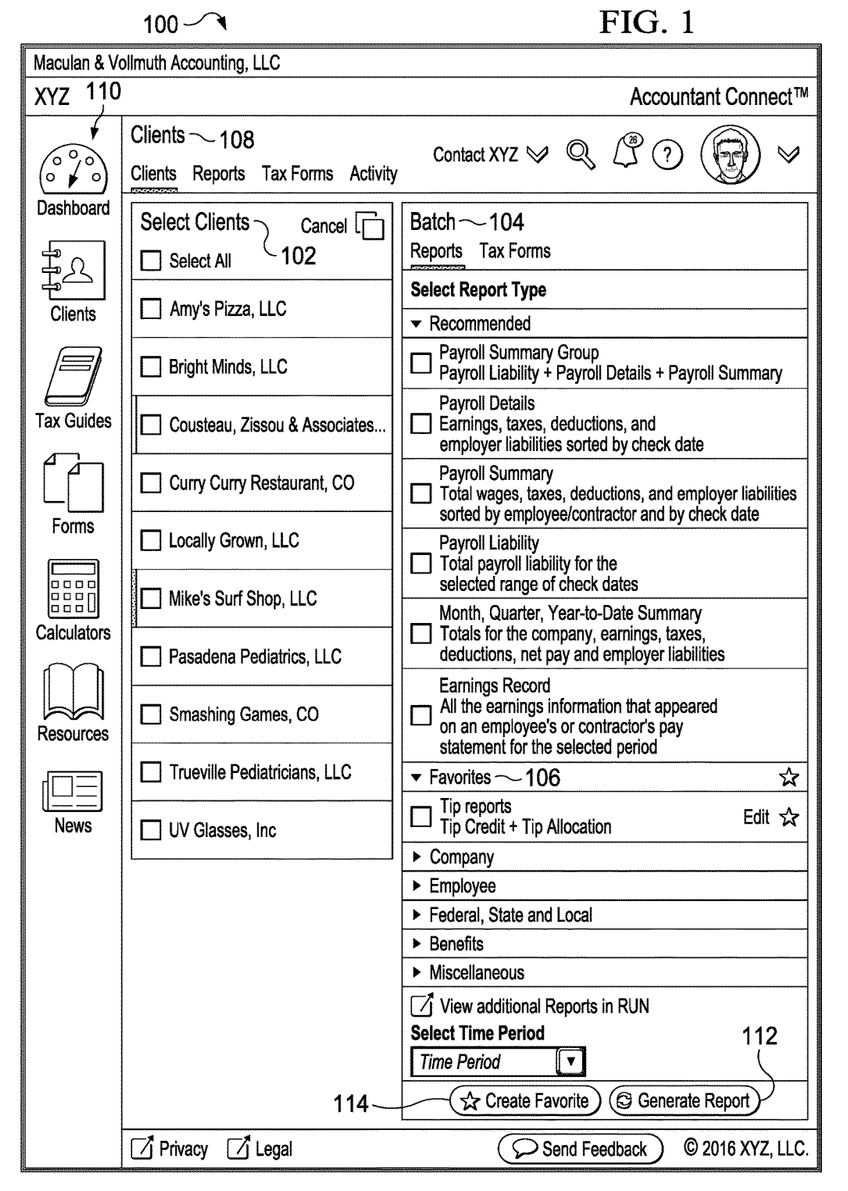
FIG. 1 is an example of a screenshot of a remote display device as modified by a server computer, in accordance with an illustrative embodiment.

FIG. 1 is an example of a screenshot of a remote display device as modified by a server computer, in accordance with an illustrative embodiment. Screenshot 100 is an example of how a remote server might modify the display of a client computer. Initially, the remote client computer is commanded to display taxable entities 102 to which a user of the client computer has access. Taxable entities 102, identified by the prompt to "select clients", are shown in a first area of screenshot 100. A user login, such as user name and password, may be used to identify these particular taxable entities 102.

At the same time, or possibly later depending on additional user input, the server computer instructs the remote client computer to display report types 104. Report types 104 are shown in a second area of screenshot 100. Additional information may be displayed, such as favorites 106 to increase the ease of use of the interface represented by screenshot 100. Still additional information may be shown, as indicated in FIG. 1.

Alternatively, different information may be displayed in either or both of the first and second areas. The user may manipulate menu 108, for example, to display different types of information such as reports, tax forms, and activity as indicated in menu 108. Still further information may be displayed, such as in side bar 110.

After a user has entered all desired selections, the user may activate "generate report" button 112 in order to transmit the desired selections to the server computer. A user may also select "create favorite" button 114 in order to automatically select the same selections over again so that the user does not have to go through all selections in screenshot 100 in order to produce an identical request for information.

Reports may be produced and corresponding data surfaced in a number of different ways. For example, reports may show data in PDF format, but an interactive data visualization user interface could be used, such as via a website. The data could also be surfaced in HTML format.

Figure 2:
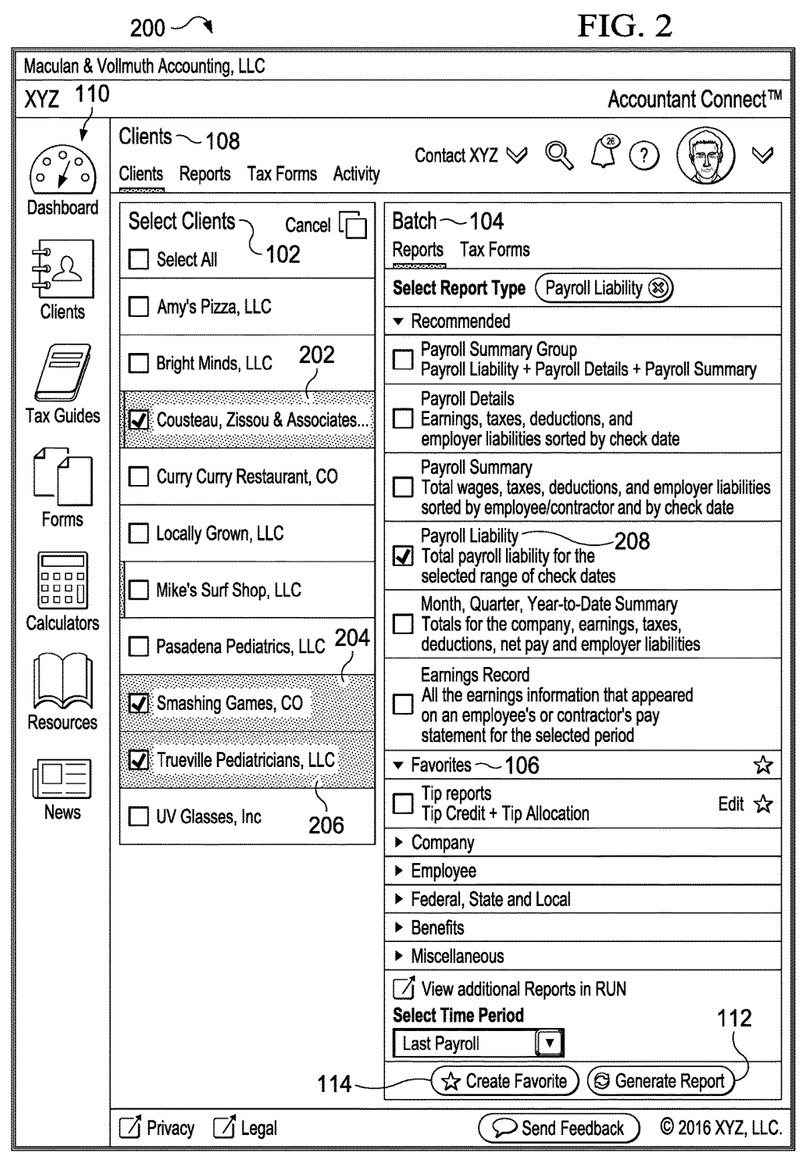
FIG. 2 is an example of a second screenshot of a remote display device as further modified by a server computer, in accordance with an illustrative embodiment.

FIG. 2 is an example of a second screenshot of a remote display device as further modified by a server computer, in accordance with an illustrative embodiment. Screenshot 200 is a continuation of screenshot 100 of FIG. 1; thus, FIG. 1 and FIG. 2 should be considered together and common reference numerals share common descriptions relative to FIG. 1.

In particular, screenshot 200 shows a specific, non-limiting example of user selections that may be input by a user manipulating the display shown in screenshot 100 of FIG. 1. In this example, the user selected checkbox 202, checkbox 204, and checkbox 206 to indicate that the user wishes to retrieve or generate reports for the indicated taxable entities. The user also selected checkbox 208 to indicate that the user wishes to retrieve or generate form relating to payroll liability. The user then selects "generate report" button 112 in order to instruct the server to find the documents that correspond to the selected taxable entities and report type.

Figure 3:
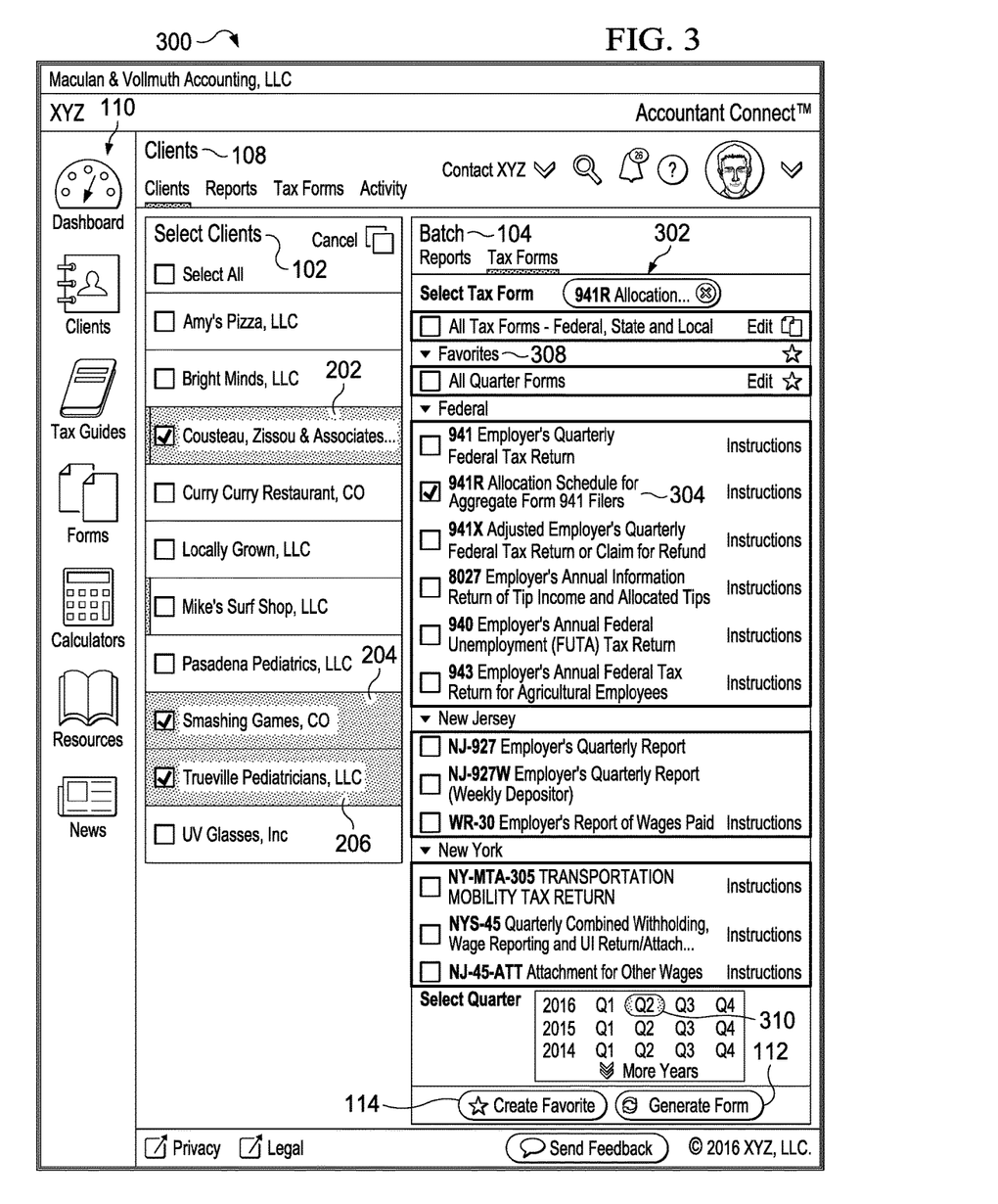
FIG. 3 is an example of a third screenshot of a remote display device as further modified by a server computer, in accordance with an illustrative embodiment.

FIG. 3 is an example of a third screenshot of a remote display device as further modified by a server computer, in accordance with an illustrative embodiment. Screenshot 300 is a continuation of screenshot 200 of FIG. 2 and screenshot 100 of FIG. 1. FIG. 1 through FIG. 3 should be considered together and common reference numerals share common descriptions relative to FIG. 1 and FIG. 2.

In this illustrative embodiment, the server has modified the display of the remote client computer from screenshot 200 to screenshot 300. Taxable entities 102 are still shown in the first area of the display to indicate which taxable entities are applicable, but now the second area of the display shows particular tax forms that may apply to those taxable entities 102 which also relate to payroll liability, as selected in screenshot 200 of FIG. 2. Thus, the second area of the display shows tax form check boxes 302 which satisfy the requested inquiry.

The user of the remote client computer then selects which report the user would like to see. In this example, the user selected check box 304, which corresponds to tax form 941R for allocation schedule for aggregate form 941 filers. Once the "generate form" button 112 is selected the server will command the remote client computer to display the corresponding forms for the selected taxable entities. Alternatively, the server can transmit to the remote client computer the actual forms themselves, perhaps upon request.

In an illustrative embodiment, the server can command the remote client to display the returned possible forms according to an organization scheme. In this example, the selected taxable entities have tax obligations in multiple tax jurisdictions. Thus, screenshot 300 shows that the server commanded the remote client computer to organize the forms according to tax jurisdiction. Further organization is possible, such as by indicating favorites 308, which are user-defined and frequently used requests, and additional filters such as time filter menu 310. Time filter menu 310 can be used to further filter the files ultimately displayed or returned to the remote client computer according to a date or time range. Other filters or display organization schemes are possible.

Figure 4:
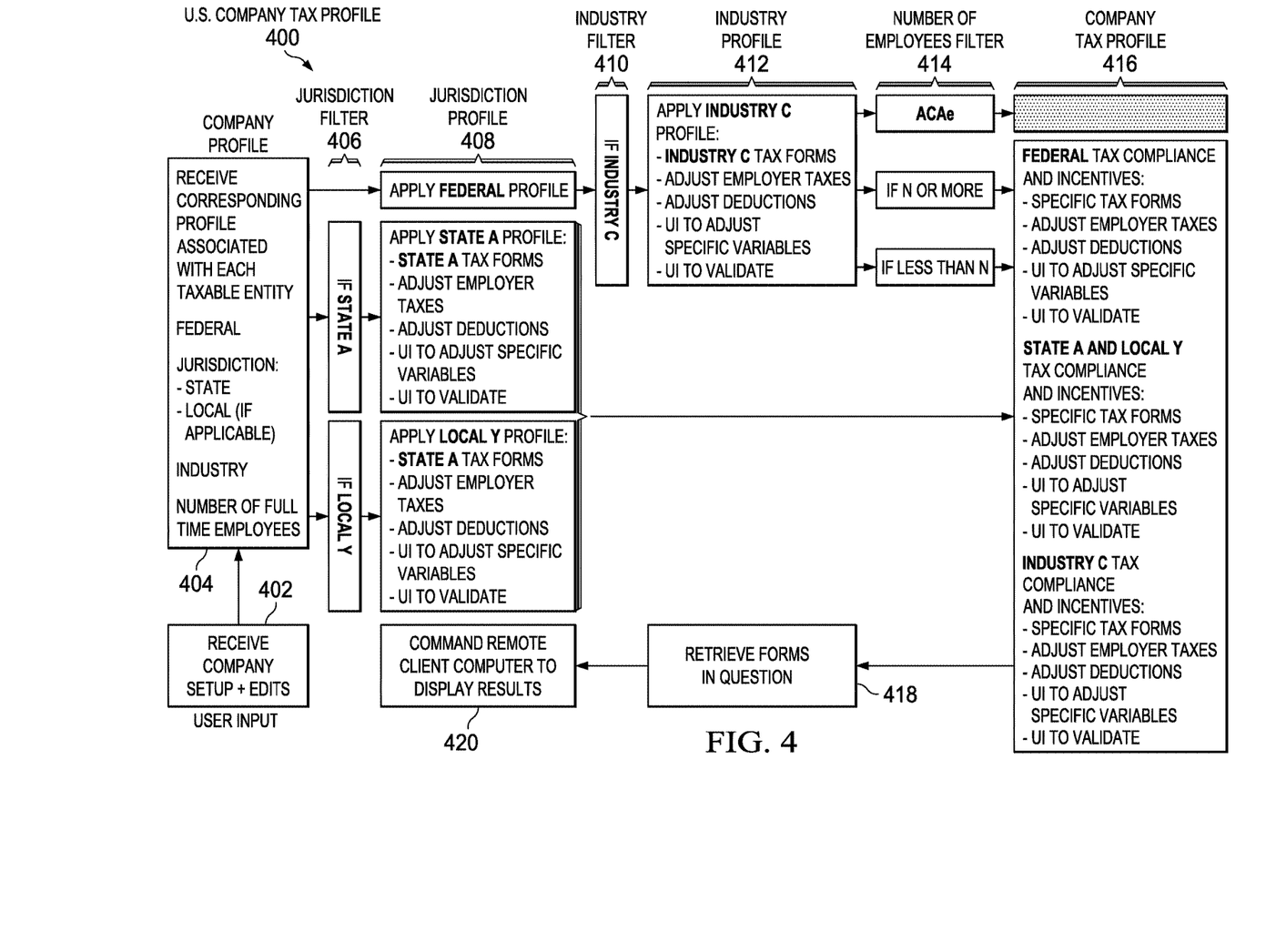
FIG. 4 is a method for modifying a display device of a remote client computer using a server computer, in accordance with an illustrative embodiment.

FIG. 4 is a method for modifying a display device of a remote client computer using a server computer, in accordance with an illustrative embodiment. Method 400 may be performed by a server computer. Method 400 shows a method for processing input received from a remote client computer and then commanding the remote client computer to display information. Method 400 may be used to cause a server computer to order a remote client computer to display the screenshots shown in FIG. 1 through FIG. 3.

In an illustrative embodiment, method 400 begins by receiving from a remote client computer company setup and edits (operation 402). In this operation the server computer receives information regarding which taxable entities will be applicable to this enquiry. Example screenshots of providing this kind of input are shown in FIG. 1 through FIG. 3.

Next, the remote server retrieves a corresponding profile associated with each taxable entity (operation 404). Typically, a given taxable entity has a unique profile. The profile contains information such as, but not limited to, jurisdiction, industry, number of employees, income, revenue, expenses, or possibly any information that may be of interest to users manipulating the remote client computer.

The server computer then applies a jurisdiction filter (operation 406). The jurisdiction filter filters all available forms according to the jurisdictions that apply, whether state, federal, or local. Thereafter, the server computer then retrieves a series of profiles, including jurisdiction profile (operation 408), industry filter (operation 410), industry profile (operation 412), and number of employees filter (operation 414). Different, fewer, or additional filters and profiles may be applied. In these processes, as indicated in FIG. 4, the server computer applies state, federal, and local profiles and filters if applicable, such as whether particular rules apply, particular or special forms are required, and whether laws apply such as for example whether a taxable entity is subject to the Affordable Care Act indicated in number of employees filter of operation 414.

The result is to generate a tax profile (operation 416). The tax profile is then used to retrieve the forms or documents in question (operation 418). The server computer then commands the remote client computer to display the results (operation 420), or possibly to transmit the forms to the remote client computer. The method may terminate thereafter.

Figure 5:
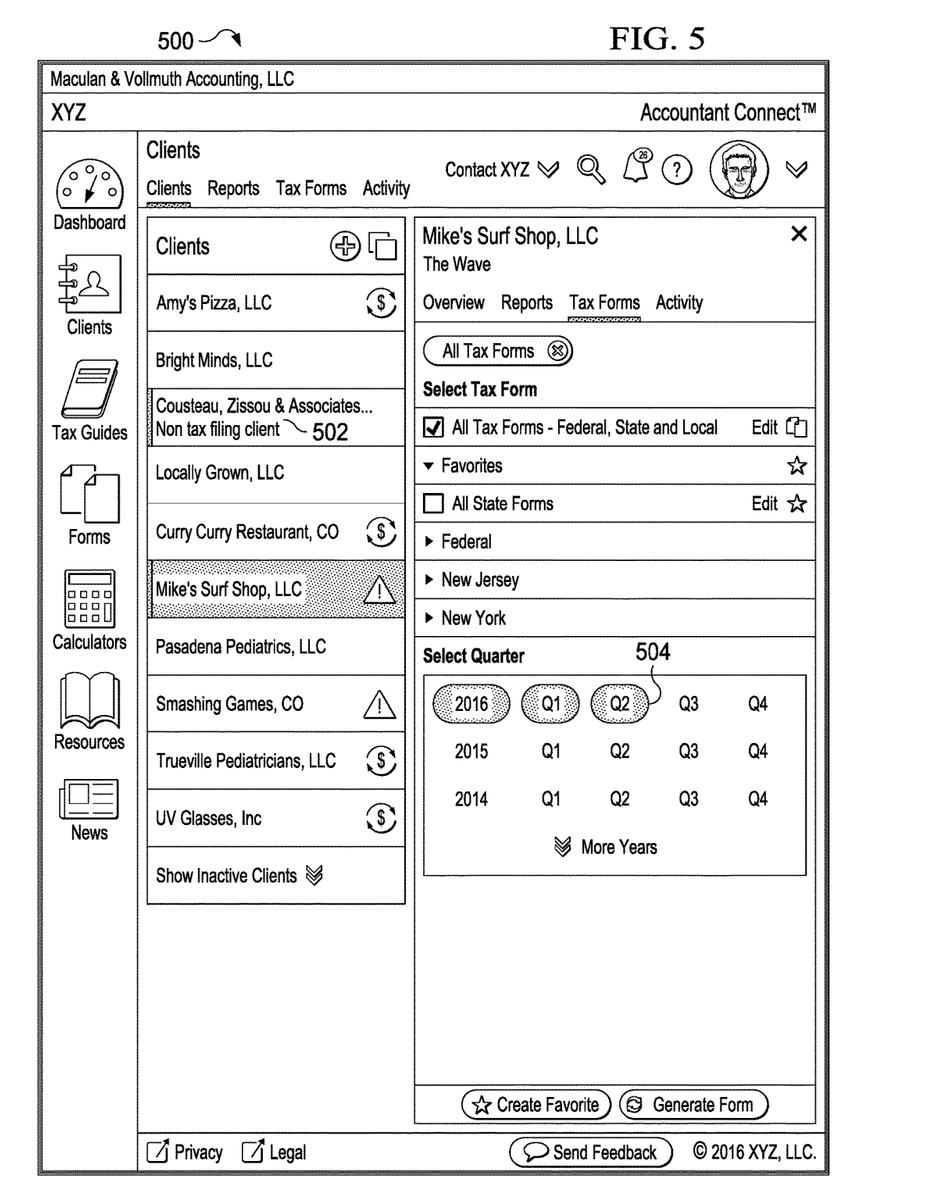
FIG. 5 is an example of a screenshot of the display device modified according to the method shown in FIG. 4, in accordance with an illustrative embodiment.

FIG. 5 is an example of a screenshot of the display device modified according to the method shown in FIG. 4, in accordance with an illustrative embodiment. More specifically, FIG. 5 is an example of a screenshot of the display device of the remote client computer showing application of additional filters, such as time filters. Screenshot 500 may be generated using method 400 in FIG. 4. Screenshot 500 indicates that one taxable entity was selected as indicated by arrow 502, and that a time filter is being requested according to two quarters in tax year 2016, as indicated by arrow 504. These filters are then applied to return or display the requested tax documents.

Figure 6:
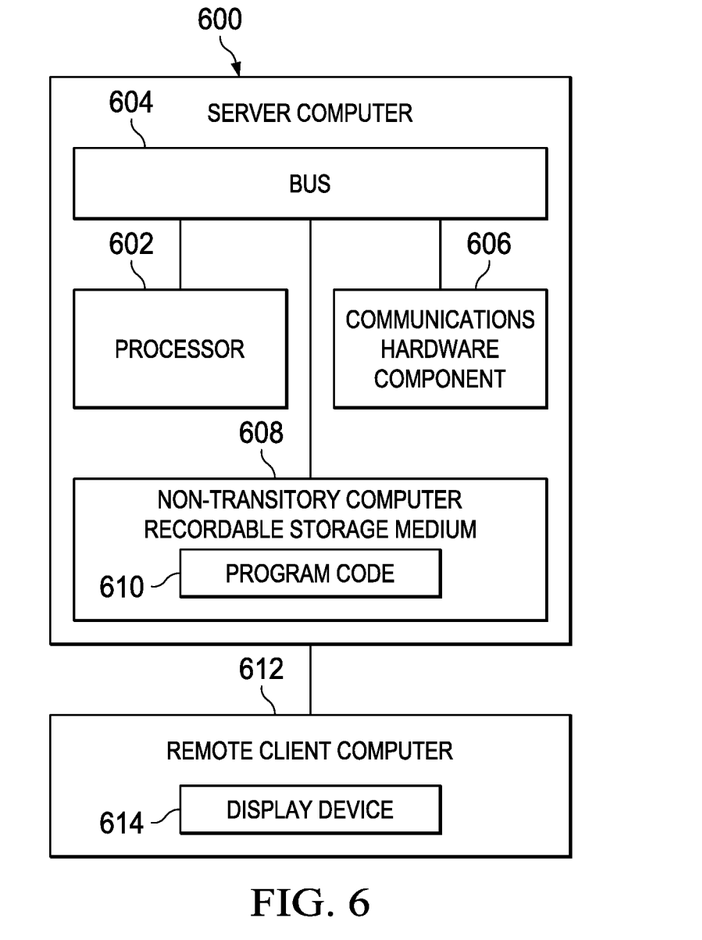
FIG. 6 is a block diagram of a server computer for modifying a display device of a remote client computer, in accordance with an illustrative embodiment.

FIG. 6 is a block diagram of a server computer for modifying a display device of a remote client computer, in accordance with an illustrative embodiment. Server computer 600 is an example of a server computer that can command a remote client to modify its display as shown in FIG. 1 through FIG. 3, and FIG. 5. Server computer 600 can also execute method 400 of FIG. 4.

Server computer 600 includes processor 602, bus 604 connected to processor 602, communications hardware component 606 connected to bus 604, and non-transitory computer recordable storage medium 608 connected to bus 604. Non-transitory computer recordable storage medium 608 stores program code 610 which, when executed by processor 602, performs an Internet-centric method for modifying display device 614 of remote client computer 612 remote from server computer 600. Program code 610 includes program code for receiving a login request at server computer 600 over the Internet from remote client computer 612.

Program code 610 also includes program code for: responsive to remote client computer 612 successfully logging in, server computer 600 transmitting first instructions to remote client computer 612 to modify a display device of remote client computer 612 to present, on a first area of the display device, a plurality of different taxable entities to which remote client computer 612 has information access, and further to modify the display device of remote client computer 612 to present, on a second area of the display device, a plurality of different report types. Program code 610 also includes program code for receiving input at server computer 600 over the Internet from remote client computer 612, the input comprising a first selection on the first area of the display device of a first subset of the plurality of different taxable entities, and the input further comprising a second selection on the second area of the display device of a second subset of the plurality of different report types.

Program code 610 also includes program code for determining, by server computer 600, a plurality of different specific forms which relate only to the first subset and are also only within the second subset. Program code 610 also includes program code for transmitting, by server computer 600 over the Internet to the remote client computer, second instructions to the remote client computer to modify the second area of the display device to display only the plurality of different specific forms.

Server computer 600 may be further modified. For example, in an illustrative embodiment program code 610 may further include program code for: after transmitting the second instructions, receiving, by server computer 600 over the Internet from the remote client computer, a third selection on the second area of the display device of a third subset of the plurality of different specific forms. In this case, program code 610 may further include program code for transmitting, by server computer 600 over the Internet to the remote client computer, third instructions to display on the display device the third subset of the plurality of different specific forms.

In another illustrative embodiment, program code 610 may further include program code for transmitting, by server computer 600 over the Internet to the remote client computer, the plurality of different specific forms. In still another illustrative embodiment, program code 610 may further include program code for determining the plurality of different taxable entities based on a user profile specifically assigned to a user of the remote client computer.

Thus, the advantageous embodiments shown in FIG. 6 do not necessarily limit the claimed inventions. Likewise, the advantageous embodiments shown in FIG. 6 do not necessarily limit the other examples given above in FIG. 1 through FIG. 5. Other variations are possible.

Figure 7:
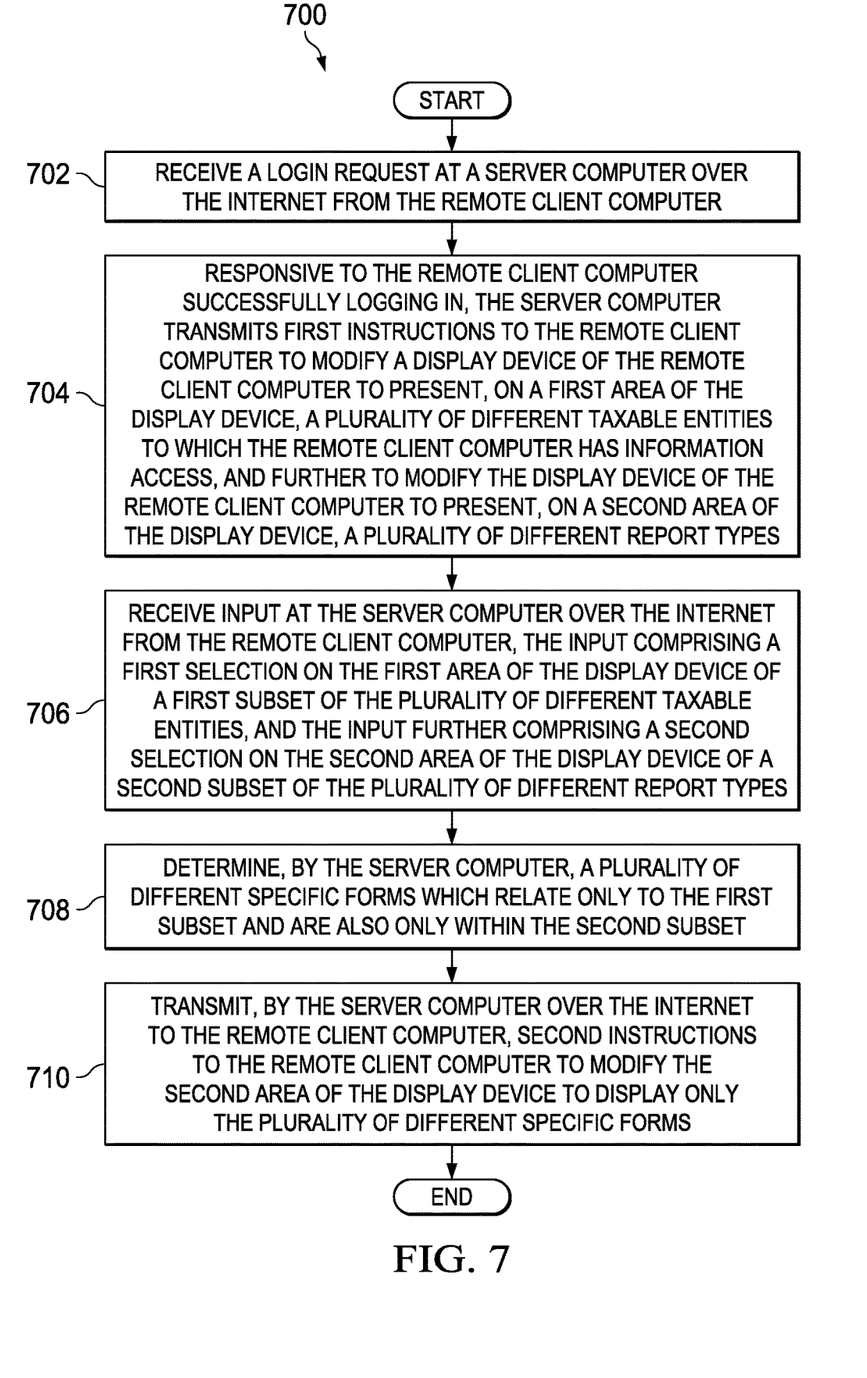
FIG. 7 is a method for modifying a display device of a remote client computer using a server computer, in accordance with an illustrative embodiment.

FIG. 7 is a method for modifying a display device of a remote client computer using a server computer, in accordance with an illustrative embodiment. Method 700 is an alternative method to method 400 shown in FIG. 4. Method 700 may be used to generate the screenshot shown in FIG. 1 through FIG. 3 and FIG. 4. Method 700 may be executed in a server computer, such as server computer 600 of FIG. 6, with the server computer giving commands to the remote client computer to modify a display device on the remote client computer. Thus, method 700 may be characterized as a method remotely modifying a display device of a remote client computer.

Method 700 includes receiving a login request at a server computer over the Internet from the remote client computer (operation 702). Then, responsive to the remote client computer successfully logging in, the server computer transmits first instructions to the remote client computer to modify a display device of the remote client computer to present, on a first area of the display device, a plurality of different taxable entities to which the remote client computer has information access, and further to modify the display device of the remote client computer to present, on a second area of the display device, a plurality of different report types (operation 704).

Then method 700 includes receiving input at the server computer over the Internet from the remote client computer, the input comprising a first selection on the first area of the display device of a first subset of the plurality of different taxable entities, and the input further comprising a second selection on the second area of the display device of a second subset of the plurality of different report types (operation 706). Method 700 also includes determining, by the server computer, a plurality of different specific forms which relate only to the first subset and are also only within the second subset (operation 708).

Method 700 also includes transmitting, by the server computer over the Internet to the remote client computer, second instructions to the remote client computer to modify the second area of the display device to display only the plurality of different specific forms (operation 710). The method may terminate thereafter.

Method 700 may be varied. For example, method 700 may include more, fewer, or different operations.

In an example where method 700 is extended, method 700 may also include: after transmitting the second instructions, receiving, by the server computer over the Internet from the remote client computer, a third selection on the second area of the display device of a third subset of the plurality of different specific forms. In this case, method 700 may also include transmitting, by the server computer over the Internet to the remote client computer, third instructions to display on the display device the third subset of the plurality of different specific forms.

In another illustrative embodiment, method 700 may also include transmitting, by the server computer over the Internet to the remote client computer, the plurality of different specific forms. In yet another illustrative embodiment, method 700 may also include determining the plurality of different taxable entities based on a user profile specifically assigned to a user of the remote client computer. In this case, as part of transmitting the second instructions, the server computer further transmits second additional instructions to display, highlighted to indicate as not requested, a specific report not applicable to any of the plurality of different taxable entities, but instead determined by the server computer to be relevant to the request according to data in a plurality of entity profiles associated with corresponding ones of the plurality of different taxable entities. In a related illustrative embodiment, the plurality of entity profiles are template-based text profiles containing unstructured text relating to tax information, and wherein the server computer is further configured to parse the unstructured text into parsed text and modify the determining according to the parsed text.

In a different illustrative embodiment, method 700 may be varied such that determining the plurality of different specific forms further includes limiting a number of the plurality of different specific forms according to a date range received from the remote client computer. In yet another illustrative embodiment, as part of transmitting the first instructions, the sever computer further transmits additional instructions to display only report types which are applicable to only the plurality of different taxable entities. in this case, as part of transmitting the first instructions, the server computer further transmits second additional instructions to display, highlighted to indicate as being non-selectable, report types not applicable to any of the plurality of different taxable entities.

In still another illustrative embodiment, determining a plurality of different specific forms may include applying a plurality of entity profiles corresponding to ones of the plurality of different taxable entities to filter all forms relating to the plurality of different entities to find the plurality of specific forms. In this case, each of the plurality of entity profiles contain tax jurisdiction data, industry data, and number of employees data, and filtering all forms further includes filtering all forms based on the tax jurisdiction data, the industry data, and the number of employees data. In a related illustrative embodiment, method 700 also includes applying user-defined data, received from the remote client computer, to further filter all forms.

Thus, the advantageous embodiments shown in FIG. 7 do not necessarily limit the claimed inventions. Likewise, the advantageous embodiments shown in FIG. 7 do not necessarily limit the other examples given above in FIG. 1 through FIG. 6. Other variations are possible.

Figure 8:
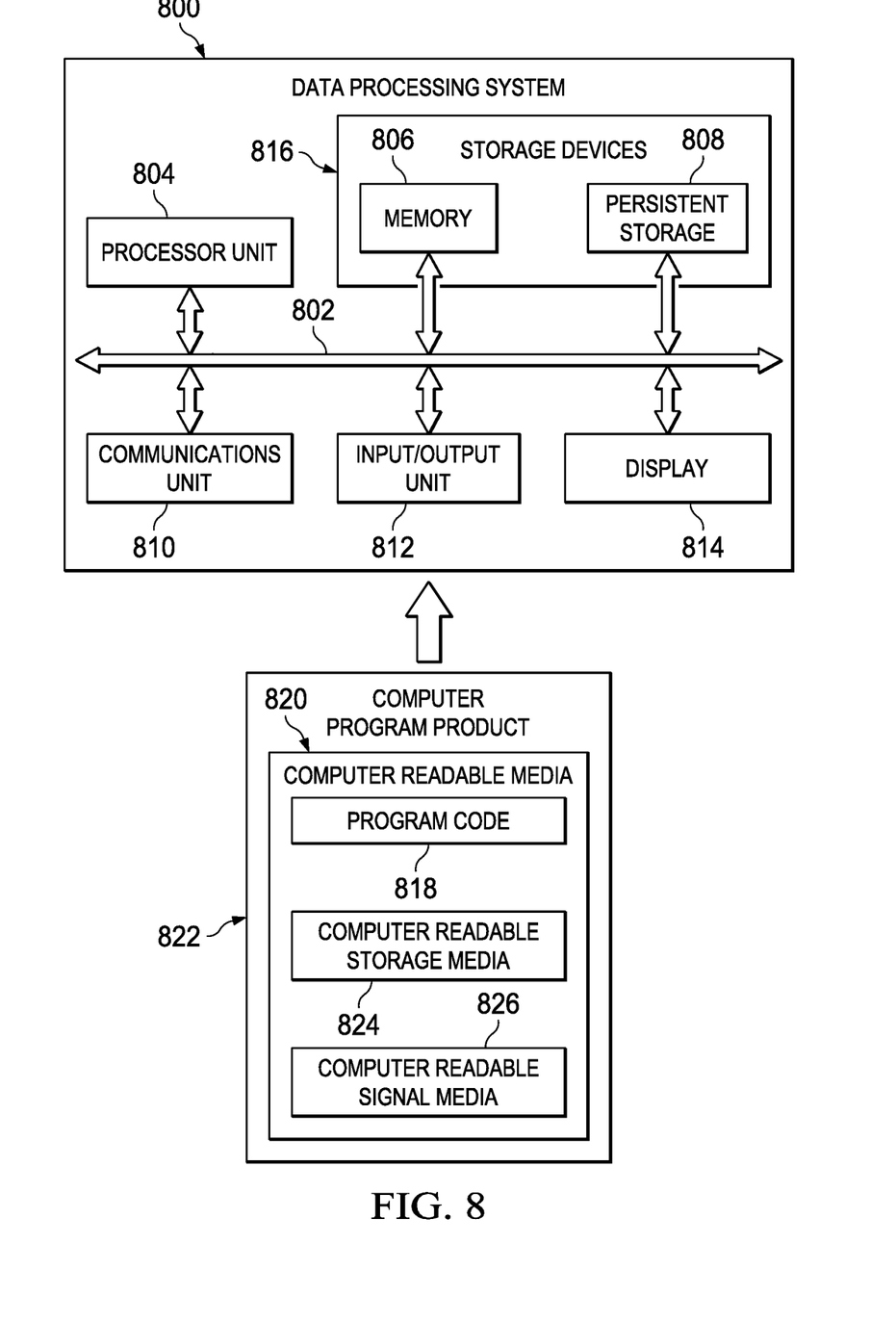
FIG. 8 is a block diagram of a data processing system depicted in accordance with an illustrative embodiment.

FIG. 8 is a block diagram of a data processing system depicted in accordance with an illustrative embodiment. Data processing system 800 is an example of a server computer as described with respect to FIG. 1 through FIG. 7. Data processing system 800 may also be an example of a remote client computer as described with respect to FIG. 1 through FIG. 7.

In this illustrative example, data processing system 800 includes communications framework 802, which provides communications between processor unit 804, memory 806, persistent storage 808, communications unit 810, input/output unit 812, and display 814. In this example, communication framework may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. The program code may be program code 610 of FIG. 6. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for remotely modifying a display device of a remote client computer, the method comprising:
receiving a login request at a server computer over the Internet from the remote client computer;
responsive to the remote client computer successfully logging in, the server computer transmitting first instructions to the remote client computer to modify a display device of the remote client computer to present, on a first area of the display device, a plurality of different taxable entities to which the remote client computer has information access, and further to modify the display device of the remote client computer to present, on a second area of the display device, a plurality of different report types;
receiving input at the server computer over the Internet from the remote client computer, the input comprising a first selection on the first area of the display device of a first subset of the plurality of different taxable entities, and the input further comprising a second selection on the second area of the display device of a second subset of the plurality of different report types;
determining, by the server computer, a plurality of different specific forms which relate only to the first subset and are also only within the second subset; and
transmitting, by the server computer over the Internet to the remote client computer, second instructions to the remote client computer to modify the second area of the display device to display only the plurality of different specific forms.

2. The method of claim 1 further comprising:
after transmitting the second instructions, receiving, by the server computer over the Internet from the remote client computer, a third selection on the second area of the display device of a third subset of the plurality of different specific forms; and
transmitting, by the server computer over the Internet to the remote client computer, third instructions to display on the display device the third subset of the plurality of different specific forms.

3. The method of claim 1 further comprising:
transmitting, by the server computer over the Internet to the remote client computer, the plurality of different specific forms.

4. The method of claim 1 further comprising:
determining the plurality of different taxable entities based on a user profile specifically assigned to a user of the remote client computer.

5. The method of claim 4, wherein, as part of transmitting the second instructions, the server computer further transmits second additional instructions to display, highlighted to indicate as not requested, a specific report not applicable to any of the plurality of different taxable entities, but instead determined by the server computer to be relevant to the request according to data in a plurality of entity profiles associated with corresponding ones of the plurality of different taxable entities.

6. The method of claim 5, wherein the plurality of entity profiles are template-based text profiles containing unstructured text relating to tax information, and wherein the server computer is further configured to parse the unstructured text into parsed text and modify the determining according to the parsed text.

7. The method of claim 1 determining the plurality of different specific forms further includes limiting a number of the plurality of different specific forms according to a date range received from the remote client computer.

8. The method of claim 1, wherein, as part of transmitting the first instructions, the sever computer further transmits additional instructions to display only report types which are applicable to only the plurality of different taxable entities.

9. The method of claim 8, wherein, as part of transmitting the first instructions, the server computer further transmits second additional instructions to display, highlighted to indicate as being non-selectable, report types not applicable to any of the plurality of different taxable entities.

10. The method of claim 1, wherein determining a plurality of different specific forms comprises:
applying a plurality of entity profiles corresponding to ones of the plurality of different taxable entities to filter all forms relating to the plurality of different entities to find the plurality of specific forms.

11. The method of claim 10, wherein each of the plurality of entity profiles contain tax jurisdiction data, industry data, and number of employees data, and wherein filtering all forms further includes filtering all forms based on the tax jurisdiction data, the industry data, and the number of employees data.

12. The method of claim 11 further comprising:
applying user-defined data, received from the remote client computer, to further filter all forms.

13. A server computer comprising:
a processor;
a bus connected to the processor;
a communications hardware component connected to the bus;
a non-transitory computer recordable storage medium, connected to the bus, storing program code which, when executed by the processor, performs an Internet-centric method for modifying a display device of a remote client computer remote from the server computer, the program code comprising:
program code for receiving a login request at the server computer over the Internet from the remote client computer;
program code for: responsive to the remote client computer successfully logging in, the server computer transmitting first instructions to the remote client computer to modify a display device of the remote client computer to present, on a first area of the display device, a plurality of different taxable entities to which the remote client computer has information access, and further to modify the display device of the remote client computer to present, on a second area of the display device, a plurality of different report types;
program code for receiving input at the server computer over the Internet from the remote client computer, the input comprising a first selection on the first area of the display device of a first subset of the plurality of different taxable entities, and the input further comprising a second selection on the second area of the display device of a second subset of the plurality of different report types;
program code for determining, by the server computer, a plurality of different specific forms which relate only to the first subset and are also only within the second subset; and
program code for transmitting, by the server computer over the Internet to the remote client computer, second instructions to the remote client computer to modify the second area of the display device to display only the plurality of different specific forms.

14. The server computer of claim 13, wherein the program code further comprises:
program code for: after transmitting the second instructions, receiving, by the server computer over the Internet from the remote client computer, a third selection on the second area of the display device of a third subset of the plurality of different specific forms; and
program code for transmitting, by the server computer over the Internet to the remote client computer, third instructions to display on the display device the third subset of the plurality of different specific forms.

15. The server computer of claim 13, wherein the program code further comprises:
program code for transmitting, by the server computer over the Internet to the remote client computer, the plurality of different specific forms.

16. The server computer of claim 13, wherein the program code further comprises:
program code for determining the plurality of different taxable entities based on a user profile specifically assigned to a user of the remote client computer.

17. A non-transitory computer recordable storage medium storing program code which, when executed by a processor, performs an Internet-centric method for modifying a display device of a remote client computer remote from a server computer, the program code comprising:
program code for receiving a login request at a server computer over the Internet from the remote client computer;
program code for: responsive to the remote client computer successfully logging in, the server computer transmitting first instructions to the remote client computer to modify a display device of the remote client computer to present, on a first area of the display device, a plurality of different taxable entities to which the remote client computer has information access, and further to modify the display device of the remote client computer to present, on a second area of the display device, a plurality of different report types;
program code for receiving input at the server computer over the Internet from the remote client computer, the input comprising a first selection on the first area of the display device of a first subset of the plurality of different taxable entities, and the input further comprising a second selection on the second area of the display device of a second subset of the plurality of different report types;
program code for determining, by the server computer, a plurality of different specific forms which relate only to the first subset and are also only within the second subset; and
program code for transmitting, by the server computer over the Internet to the remote client computer, second instructions to the remote client computer to modify the second area of the display device to display only the plurality of different specific forms.

18. The non-transitory computer recordable storage medium of claim 17, wherein the program code further comprises:
after transmitting the second instructions, receiving, by the server computer over the Internet from the remote client computer, a third selection on the second area of the display device of a third subset of the plurality of different specific forms; and
transmitting, by the server computer over the Internet to the remote client computer, third instructions to display on the display device the third subset of the plurality of different specific forms.

19. The non-transitory computer recordable storage medium of claim 17, wherein the program code further comprises:
transmitting, by the server computer over the Internet to the remote client computer, the plurality of different specific forms.

20. The non-transitory computer recordable storage medium of claim 17, wherein the program code further comprises:
determining the plurality of different taxable entities based on a user profile specifically assigned to a user of the remote client computer.

* * * * *